United States Patent [19]

Calundann

[11] 4,067,852

[45] Jan. 10, 1978

[54] MELT PROCESSABLE THERMOTROPIC WHOLLY AROMATIC POLYESTER CONTAINING POLYBENZOYL UNITS

[75] Inventor: Gordon W. Calundann, North Plainfield, N.J.

[73] Assignee: Celanese Corporation, New York, N.Y.

[21] Appl. No.: 686,189

[22] Filed: May 13, 1976

[51] Int. Cl.$^2$ .................. C08G 63/06; C08G 63/18
[52] U.S. Cl. .................. 260/47 C; 260/7.5; 260/9; 260/40 R; 260/49
[58] Field of Search .............. 260/47 C, 49, 7.5, 9 R, 260/40 R

[56] References Cited

U.S. PATENT DOCUMENTS 3,637,595  1/1972  Cottis et al. ................ 260/47 C
3,890,256  6/1975  McFarlane et al. .......... 260/47 C Primary Examiner—Lester L. Lee

[57] ABSTRACT

A wholly aromatic polyester is provided which unlike the aromatic polyesters normally encountered in the prior art is not intraciable or naturally tractable and readily undergoes melt processing with ease. The aromatic polyester of the present invention consists essentially of the concurring units (a) p-oxybenzoyl moiety, (b) 2,5-dicarboxynaphthalene moiety, and (c) symmetrical dioxy aryl moiety (as defined), and is free of units which possess ring substitution. The resulting polyester exhibits a melting point below approximately 425° C., preferably below 350° C., and most preferably below approximately 330° C. The ability of the wholly aromatic polyester to readily undergo melt processing can be attributed to its atypical inherent propensity to form a thermotropic melt phase which is exhibited in the absence of ring substitution. The particularly effective route for forming the wholly aromatic polyester is via a slurry polymerization technique (as defined).

11 Claims, 2 Drawing Figures

MELT PROCESSABLE THERMOTROPIC WHOLLY AROMATIC POLYESTER CONTAINING POLYBENZOYL UNITS

BACKGROUND OF THE INVENTION

Wholly aromatic polyester resins long have been known. For instance, p-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc. commonly have not been viable alternatives or when attempted commonly have been accomplished with difficulty.

Representative publications which discuss wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 527 to 535 (August 1974), (c) *Aromatic Polyester Plastics,* by S. G. Cottis, Modern Plastics, Pages 62 to 63 (July 1975), and (d) *Poly(p-Oxybenzoyl Systems): Homopolymer for Coatings: Copolymers for Compression and Injection Molding,* by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; and 3,890,256.

Also, it more recently has been disclosed that certain polyesters may be formed which exhibit melt anisotropy. See for instance, (a) *Polyester X7G-A Self Reinforced Thermoplastic,* by W. J. Jackson Jr., H. F. Kuhfuss, and T. F. Gray, Jr., 30th Anniversary Technical Conference, 1975 Reinforced Plastics/Composites Institute. The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819 and 2520820, (e) Japanese Pat. No. 43-223.

It is an object of the present invention to provide an improved melt processable wholly aromatic polyester which is free of ring substitution.

It is an object of the present invention to provide an improved melt processable aromatic polyester capable of forming a thermotropic melt phase at a temperature below approximately 425° C., preferably below approximately 330° C., even in the absence of ring substitution.

It is an object of the present invention to provide an improved wholly aromatic polyester which exhibits a melting point well below its decomposition temperature.

It is an object of the present invention to provide an improved wholly aromatic polyester which is crystalline in nature and highly tractable.

It is an object of the present invention to provide an improved wholly aromatic polyester which readily may be injection molded to form a molded article exhibiting superior tensile strength, flex strength and impact strength.

These and other objects, as well as the scope, nature and utilization of the invention will be apparent from the following detailed description.

In commonly assigned U.S. Pat. No. 686,191 filed concurrently herewith and now abandoned, by Gordon W. Calundann, Herbert L. Davis, Frederick J. Gorman, and Robert M. Mininni, entitled "Improved Melt Processable Thermotropic Wholly Aromatic Polyester Which Is Particularly Suited for Fiber Formation" is specifically claimed a species of the generic invention defined herein which is free of ring substitution and wherein an isophthaloyl moiety and/or meta-dioxy phenyl moiety recur in the wholly aromatic polyester in addition to p-oxybenzoyl moiety, 2,6-dicarboxynaphthalene moiety, and symmetrical dioxy aryl moiety.

SUMMARY OF THE INVENTION

It has been found that an improved melt processable wholly aromatic polyester capable of forming a thermotropic melt phase at a temperature below approximately 425° C. consists essentially of the recurring moieties I, II and III wherein:

I is

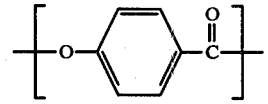

II is

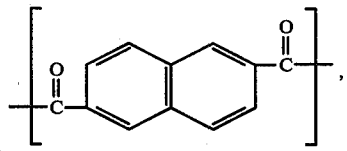

and

III is a symmetrical dioxy aryl moiety of the formula +O—Ar—O+ where Ar is a divalent radical comprising one or more fused or separate aromatic rings, and wherein said polyester comprises approximately 35 to 80 mole percent of moiety I, and wherein each moiety of the polyester is free of ring substitution. In a preferred embodiment the thermotropic melt phase is formed at a temperature below approximately 350° C., and most preferably at a temperature below approximately 330° C. Also, in a particularly preferred embodiment moiety III is

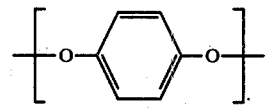

It has been found that an improved process for the formation of a melt processable wholly aromatic polyester capable of forming a thermotropic melt phase at a temperature below approximately 425° C. comprises:

a. providing in a reaction zone while present in an inert heat exchange medium polyester-forming reactants comprising a lower acyl ester of p-hydroxy benzoic acid wherein the hydroxy group is esterified, 2,6-naphthalene dicarboxylic acid, and a lower acyl diester of a symmetrical aryl diol, with the lower acyl ester of p-hydroxy benzoic acid being provided in a molar concentration of about 35 to 80 mole percent, b. condensing the reactants while heating with agitation the contents of the reaction zone at a temperature of at least about 200° C. to form the wholly aromatic polyester as a solid powder suspended in the inert heat exchange medium, and c. recovering the resulting solid powder.

DESCRIPTION OF PREFERRED EMBODIMENTS

Figure 1:
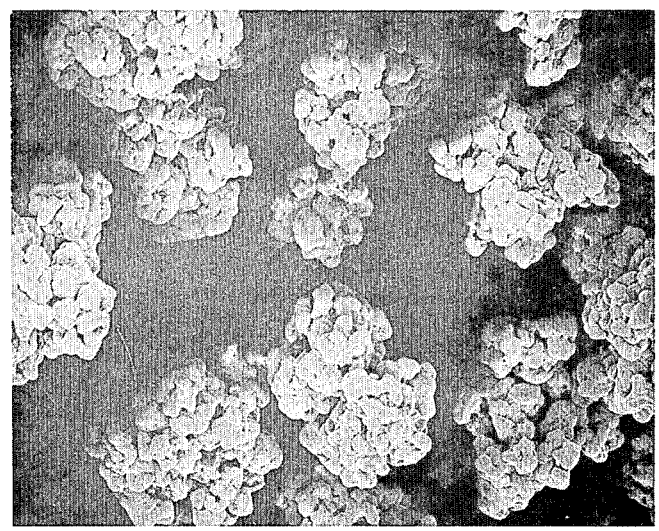
FIG. 1 is a micrograph obtained at a magnification of 150X showing agglomerates of particles of the as-prepared aromatic polyester polymer formed by the slurry polymerization technique of the present invention. The individual particles have rounded edges and range in diameter from approximately 20 to 50 μm. The agglomerates of particles range in size from approximately 80 to 150 μm.

The wholly aromatic polyester of the present invention consists essentially of three recurring moieties which when combined in the polyester have been found to form an atypical thermotropic melt phase at a temperature below approximately 425° C., preferably below approximately 350° C., and most preferably below approximately 330° C. It has been found that the melting temperature initially exhibited by the wholly aromatic polymer when it is melted for the first time following its formation may be slightly elevated above the relatively stable or constant temperature at which it melts upon subsequent heatings of the solid polymer. Any reference to melting temperatures referred to herein accordingly is with reference to such subsequent stable melting temperatures exhibited by the unannealed polyester unless otherwise specified. Such stable melting temperatures may be confirmed by the use of a differential scanning calorimeter employing repeat scans at a 20° C. per minute heat-up rate. Each moiety of the wholly aromatic polyester is free of ring substitution other than the linking bonds which form the main polymer chain. Such aromatic polyester is crystalline in nature and because of its ability to exhibit ordered anisotropic properties (i.e., liquid crystals) in the melt readily can be melt processed with ease. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The wholly aromatic polyester consists essentially of three essential moieties. Moiety I can be termed a p-oxybenzoyl moiety and possesses the structural formula:

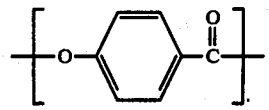

Moiety I comprises approximately 35 to 80 mole percent of the wholly aromatic polyester, and preferably 40 to 75 mole percent, and most preferably 50 to 70 mole percent (e.g. 60 mole percent). The melting point of the resulting wholly aromatic polyester tends to be lowered as one incorporates the p-oxybenzoyl moiety in the more preferred quantities.

The second key recurring unit (i.e. moiety II) of the wholly aromatic polyester is a 2,6-dicarboxynaphthalene moiety of the structural formula:

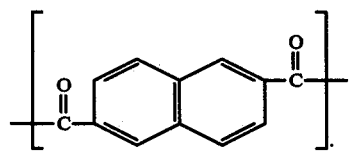

It is essential that moiety II consists of a pair of fused benzene rings as illustrated rather than a single divalent benzene ring. For instance, it has been found that if one were to substitute single benzene rings for a substantial portion of the naphthalene rings of moiety II, the properties of the resulting wholly aromatic polyester would be substantially different and adversely influenced as evidenced by substantially higher flow and melt temperatures resulting in significant degradation on processing. Commonly, moiety II comprises approximately 7.5 to 32.5 mole percent of the wholly aromatic polyester and preferably approximately 15 to 30 mole percent (e.g. approximately 20 mole percent) when forming a preferred molding resin.

The third key recurring unit (i.e. moiety III) of the wholly aromatic polyester is a symmetrical dioxy aryl moiety of the formula $+O-Ar-O+$ where Ar is a divalent radical comprising one or more fused or separate aromatic rings. Moiety III is symmetrical in the sense that the divalent bonds which join the moiety to other moieties in the main polymer chain are symmetrically disposed on one or more aromatic rings (e.g. are para to each other or diagonally disposed when present on a naphthalene ring). Commonly, moiety III comprises approximately 7.5 to 32.5 mole percent of the wholly aromatic polyester, and preferably approximately 15 to 30 mole percent (e.g. approximately 20 mole percent) when forming a preferred molding resin. Preferred moieties which may serve as the symmetrical dioxy aryl moiety in the wholly aromatic polyester of the present invention include:

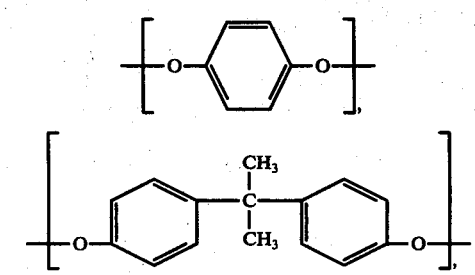

-continued

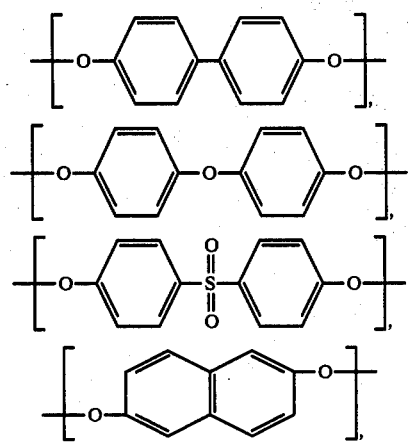

and mixtures of the foregoing.

A preferred melt processable wholly aromatic polyester capable of forming a thermotropic melt phase at a temperature below approximately 350° C. which is particularly suited for molding applications consists of the recurring moieties I, II, and III wherein:

I is

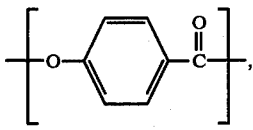

II is

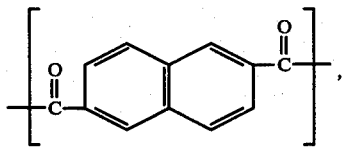

and
III is

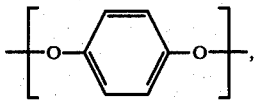

and wherein said polyester comprises approximately 40 to 75 mole percent of moiety I. A particularly preferred wholly aromatic polyester as defined above comprises approximately 50 to 70 mole percent of moiety I (e.g., approximately 60 mole percent), approximately 15 to 25 mole percent of moiety II (e.g. approximately 20 mole percent) and approximately 15 to 25 mole percent by moiety III (e.g., approximately 20 mole percent).

Other ester-forming moieties (e.g. dicarboxy or dioxy units) other than those previously discussed which are free of ring substitution additionally may be included in the wholly aromatic polyester of the present invention in a minor concentration so long as such moieties do not adversely influence the desired thermotropic melt phase exhibited by the polyester heretofore defined. As will be apparent to those skilled in the art, the total molar quantities of dicarboxy units and dioxy units present within the wholly aromatic polyester will be substantially equal. The various moieties upon polymer formation will tend to be present in a random configuration.

The wholly aromatic polyesters of the present invention commonly exhibit

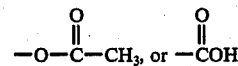

end groups depending upon the synthesis route selected. As will be apparent to those skilled in the art, the end groups optionally may be capped, e.g. acidic end groups may be capped with a variety of alcohols, and hydroxyl end groups may be capped with a variety of organic acids. For instance, end capping units such as phenylester

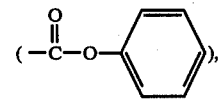

and anethylester

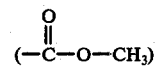

optionally may be included at the end of the polymer chains. The polymer also may be oxidatively cross-linked to at least some degree, if desired, by heating in an oxygen-containing atmosphere (e.g. in air) while in bulk form or as a previously shaped article at a temperature below its melting point for a limited period of time (e.g. for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Some solubility is discernable in pentafluorophenol.

The wholly aromatic polyesters commonly exhibit a weight average molecular weight of about 2,000 to 200,000, and preferably about 10,000 to 25,000 e.g. about 20,000 to 22,000. Such molecular weight may be determined by standard techniques not involving the solutioning of the polymer, e.g. by end group determination via infra red spectroscopy on compression molded films.

The wholly aromatic polyesters of the present invention can be considered crystalline in the sense that fibers melt extruded therefrom exhibit X-ray diffraction patterns, using Ni-filtered CuK$\alpha$ radiation and flat plate cameras, characteristic of polymeric crystalline materials. In spite of the crystallinity observed, the wholly aromatic polyesters of the present invention nevertheless may be easily melt processed.

Unlike the aromatic polyesters commonly encountered in the prior art the wholly aromatic polyesters of the present invention are not intractable and form a thermotropic melt phase whereby an atypical degree of order is manifest in the molten polymer. The subject polyester readily forms liquid crystals in the melt phase and accordingly exhibits a high tendency for the polymer chains to orient in the shear direction. Such thermotropic properties are manifest at a temperature which is amenable for melt processing to form shaped articles. Such anisotropy in the melt may be confirmed by conventional polarized light techniques whereby cross-polaroids are utilized. More specifically, the thermotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polaroids. The amount of light transmitted increases when the sample is sheared (i.e. is made to flow), however, the sample is optically anisotropic even in the static state. On the contrary typical aromatic polyesters do not transmit light to any substantial degree when examined under identical conditions.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acid halides, etc. For instance, the organic monomer compounds may be reacted in the absence of a heat exchange fluid. They accordingly may be heated initially via a solid phase condensation procedure with the temperature being progressively raised until it exceeds the polymer's melting point and with the reaction continuing via a melt condensation procedure. A vacuum may be applied to facilitate removal of volatiles formed during the condensation (e.g. acetic acid or water). Also a slurry system may be utilized initially with the reaction being completed in the melt.

Figure 2:
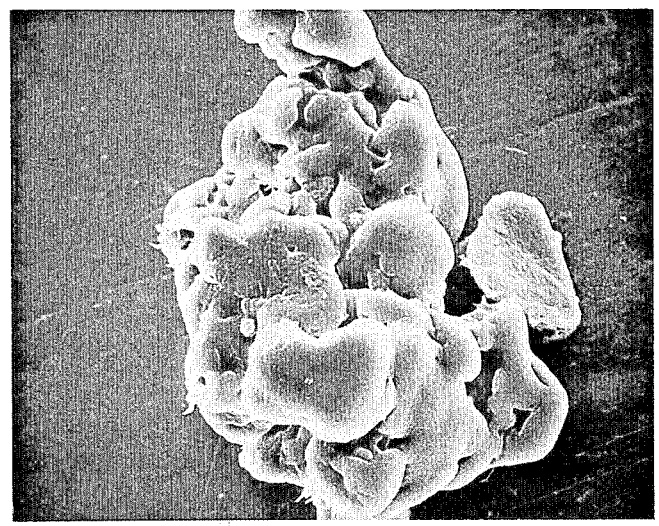
FIG. 2 is a micrograph obtained at a magnification of 750X showing a similar agglomerate of particles of the as-prepared aromatic polyester polymer formed by the slurry polymerization technique of the present invention.

In accordance with a particularly preferred embodiment the wholly aromatic polyester is formed via a slurry polymerization technique whereby the product as it is formed assumes the configuration of small agglomerates of individual particles similar to those illustrated in FIGS. 1 and 2.

More specifically, in such preferred technique, the organic monomer reactants from which the p-oxybenzoyl moiety (i.e. moiety I) and the symmetrical dioxy aryl moiety (i.e. moiety III) are derived are initially provided in a modified form whereby the usual hydroxyl groups of these monomers are esterfied (i.e. they are provided as acyl esters). For instance, lower acyl esters of p-hydroxy benzoic acid wherein the hydroxy group is esterified and lower acyl diesters of an aryl diol may be provided as reactants. The lower acyl groups preferably have from 2 to about 4 carbon atoms. Preferably the acetate esters of the organic compounds which form moieties I and III are provided. Accordingly, particularly preferred reactants for condensation with 2,6-naphthalene dicarboxylic acid are p-acetoxybenzoic acid and hydroquinone diacetate. If minor quantities of other reactants which provide oxy-units within the resulting polymer optionally are provided, these too are preferably provided as the corresponding lower acyl esters.

Relative quantities of organic monomer reactants are provided in the reaction zone so that the potential dicarboxy units and dioxy units available for incorporation in the resulting wholly aromatic polyester are substantially equal.

In accordance with the preferred slurry polymerization technique the reactants (e.g. p-acetoxybenzoic acid, 2,6-naphthalene dicarboxylic acid, and hydroquinone diacetate) are provided in an inert heat exchange medium which preferably serves as a solvent for at least one of the reactants. Typically, the 2,6-naphthalene dicarboxylic acid reactant is substantially insoluble in the inert heat exchange medium and is present therein as a finely divided solid. As the polymer forms, it is insoluble in the inert heat exchange medium and assumes the configuration of a fine powder as previously identified. The heat exchange medium preferably possesses a boiling point in excess of the maximum polymerization temperature utilized. Those inert heat exchange media having boiling ranges of about 350° to 430° C. are particularly preferred. Representative heat exchange media include the terphenyls; a eutectic mixture of 73.5 percent diphenyl oxide and 26.5 percent diphenyl, commercially available from the Dow Chemical Co. under the trademark Dowtherm A; mixtures of polychlorinated polyphenyls such as chlorinated biphenyls typified by those commercially available from the Monsanto Co. under the trademark Therminol FR; terphenyls and mixtures thereof such as those composed of meta and para isomers commercially available from the Monsanto Co. under the trademark Therminol (e.g. Therminol 88, 77, or 66); diphenylsulfone; other arylsulfones, such as substituted diphenylsulfones (e.g. ditolyl sulfone), etc. The relative quantity (weight:weight) of inert heat exchange medium to reactants in the reaction zone typically is in the ratio of heat exchange medium to total reactants of about 0.2:1 to 4:1, and most preferably about 2:1.

The slurry polymerization reaction may be carried out on a batch, continuous, or semicontinuous basis. Typical polymerization reactions commonly are carried out at a temperature of at least about 200° C. up to a temperature below the melting point or decomposition temperature of the resulting wholly aromatic polyester. In a particularly preferred embodiment of the process the temperature of the slurry is increased as the polymerization reaction progresses. A gradual or stepwise temperature increase during the polymerization has been found to insure the formation of a superior product. The maximum polymerization temperature ultimately achieved usually does not exceed about 350° C., or the initial melting point of the polymer whichever is lower. The polymerization reaction preferably is carried out with agitation at atmospheric pressure under an inert gas blanket with the condensation reaction by-products (e.g., acetic acid) being continuously removed from the reaction zone. Superatmospheric or subatmospheric pressures optionally can be utilized usually without commensurate advantage. Typical reaction times commonly range from about 2 to 30 hours, with the lesser reaction times being possible when the reaction is catalyzed.

A representative reaction heating sequence when forming a preferred wholly aromatic polyester molding resin composed of 60 mole percent of p-oxybenzoyl moiety, 20 mole percent of 2,6-dicarboxynaphthalene moiety, and 20 mole percent of di-p-oxyphenylene moiety having an initial melting point of about 360° C. and a subsequent stable (i.e., unannealed) melting point of about 325° C. is as follows:

200° to 250° C. for about 1 to 6 hours
250° to 270° C. for about 1 to 6 hours
270° to 290° C. for about 1 to 6 hours
290° to 310° C. for about 1 to 6 hours
310° to 335° C. for about 1 to 6 hours.

Representative catalysts for use in the process include dialkyl tin oxide (e.g. dibutyl tin oxide), diaryl tin oxide, titanium dioxide, alkoxy titanium silicates, titanium alkoxides, alkali and alkaline earth metal salts of lower carboxylic acids (e.g. sodium acetate, magnesium acetate, etc.), the gaseous acid catalysts such as gaseous Lewis acids, hydrogen halides (e.g. HCl), etc. The quantity of catalyst utilized typically is about 0.001 to 1 percent by weight based upon the total monomer weight, and most commonly about 0.01 to 0.2 percent by weight.

At the conclusion of the polymerization reaction the solid particulate wholly aromatic polyesters (as defined) is recovered by any convenient technique. For instance, the solid particulate polymer conveniently may be separated from the inert heat exchange medium (preferably following cooling) by decantation, centrifugation, or filtration. It is then washed, and is dried. During the washing, residual heat exchange medium adhering to the product may be removed by acetone, alcohols, lower hydrocarbons, methylene chloride, chloroform, benzene, toluene, etc., or any other relatively volatile solvent in which the heat exchange medium is soluble.

The wholly aromatic polyester of the present invention readily can be melt processed to form a variety of shaped articles, e.g. molded three dimensional articles, fibers, or films. The polyester of the present invention is particularly suited for molding applications and may be molded via standard injection molding techniques commonly utilized when forming molded articles. Unlike the wholly aromatic polyesters commonly encountered in the prior art it is not essential that more severe injection molding conditions (e.g. high temperatures), compression molding, impact molding, or plasma spraying techniques be utilized. Fibers or films may be melt extruded.

When it is intended that the wholly aromatic polyester be utilized in molding applications, one or more solid fillers or reinforcing agents optionally may be incorporated in the same via a melt admixture technique to form a filled and/or reinforced injection molding compound. Such fillers and/or reinforcing agents may be included in a total concentration of about 1 to 60 percent by weight of the resulting molding compound. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton wool, and wood cellulose fibers, etc. If desired, the fibrous reinforcement may be preliminarily treated to improve its adhesion ability to the wholly aromatic polyester which ultimately serves as a continuous matrix phase. Representative filler materials include calcium silicate, silica, clays, talc, mica, polytetrafluoroethylene, graphite, alumina trihydrate, sodium aluminum carbonate, barium ferrite, etc. Colorants optionally may be included.

Molded shaped articles formed from the wholly aromatic polyester of the present invention generally exhibit a superior tensile strength, flex strength, and impact strength when compared with wholly aromatic polyesters of the prior art. Also, the appearance of the resulting molded articles generally is superior with the resulting molded articles commonly exhibiting a light opaque color and an attractive smooth surface. The shaped articles may be utilized for extended periods of time at relatively high temperatures (e.g. 180° to 200° C.) without being adversely influenced, and exhibit an inherent resistance to burning.

The following examples are presented as specific illustrations of the claimed invention. It should be understood, however, that the invention is not limited to the specific details set forth in the examples.

EXAMPLE 1

To a three-neck, round bottom flask equipped with a stirrer, nitrogen inlet tube, and a heating tape wrapped distillation head connected to a condenser were added the following:

a. 54.04 grams p-acetoxybenzoic acid (0.3 mole)
b. 21.62 grams 2,6-naphthalene dicarboxylic acid (0.1 mole)
c. 19.42 grams hydroquinone diacetate (0.1 mole)
d. 0.14 gram dibutyl tin oxide catalyst
e. 190 grams terphenyl mixture heat exchange medium available from the Monsanto Co. under the trademark Therminol 66.

The p-acetoxybenzoic acid and the hydroquinone diacetate reactants were soluble in the heat exchange medium, and the 2,6-naphthalene dicarboxylic acid reactant remained largely suspended therein as a finely divided solid.

The contents of the flask were stirred under a slow nitrogen stream throughout the polymerization reaction. The distillation head was maintained at a temperature of about 100° to 120° C. throughout the polymerization.

The reaction slurry initially was heated to 200° C. over a period of about 60 minutes and the temperature was increased stepwise in 10° C. increments from 200° to 260° C. over a period of about 7 hours. The slurry was maintained at least 1 hour at 200° C. and at each intermediate heating temperature. Approximately 19 ml. of acetic acid distillate was collected during this period. The temperature of the stirred slurry was maintained at 260° C. for an additional 15 hours and then increased stepwise over a period of 5 hours to 335° C. at a rate of 10° to 15° C. every 1 to 2 hours (e.g. 1 hour at 290° C., 1 hour at 305° C., 1 hour at 320° C., 1 hour at 335° C.). After the slurry was held at 335° C. for 1 hour, and it was allowed to cool to ambient temperature (i.e., about 25° C.). Approximately 22 ml. of additional acetic acid distillate was collected.

The wholly aromatic polyester product was suspended in the heat exchange medium as a finely solid powder. These solids were removed from the heat exchange medium by filtration, and were raised four times with acetone employing 300 ml. of acetone during each rinse. The product next was dried in a forced air oven maintained at 130° C. for about 55 minutes.

The resulting product consisted of 63.7 grams (i.e., 97.8% of theory) of the wholly aromatic polyester which was a fine light yellow powder as illustrated in the drawings.

When the product is subjected to differential scanning calorimetry, it exhibited a large sharp endotherm at about 340° C. (peak), and a remelt scan of this polymer shows a large sharp melt endotherm at about 325° C. (peak) which repeats at about 325° C. on subsequent remelt scans.

When the melt is cooled in a differential scanning calorimeter at a rate of −20° C./min., a sharp polymer crystallization exotherm is observed at about 290° C. (peak) indicating a rapid crystallization at a relatively high temperature which confirms its molding propensity employing short cycle times.

A sample of the product was molded with ease at 325° C. on an 0.8 oz. Arburg injection molding machine under the following molding conditions:

| Cylinder Temperature | |
|---|---|
| Rear (° C.) | 315 |
| Front | 325 |
| Nozzel | 325 |
| Mold Temperature (° C.) | 93 |
| Cycle Time (sec.) | |
| Injection | 12 |
| Cooling | 20 |
| Delay | 3 |
| Total | 35 |
| Screw RPM | 260 |
| Injection Pressure (psi) | 14,000 |

The resulting bars had a configuration of standard molding bars according to ASTM specifications, and were light yellow in color and had a smooth attractive surface. The average physical properties of the resulting molded bars are set forth below. For comparative purposes the corresponding physical properties published in Carborundum Company trade literature for a commercially available wholly aromatic copolyester is provided. The commercially available wholly aromatic copolyester is available from the Carborundum Company under the EKKCEL I-2000 trademark and consists of recurring p-oxybenzoyl moiety, terephthaloyl moiety, and dioxy-4,4'-biphenylene moiety.

| | EXAMPLE I (experimentally determined) | EKKCEL I-2000 (from literature) |
|---|---|---|
| Tensile Strength, psi | 17,200 | 14,000 |
| Tensile Modulus, $10^6$ psi | 0.989 | 0.35 |
| Elongation % | 2.67 | 8 |
| Flex. Str., psi | 20,240 | 17,000 |
| Flex. Mod., $10^6$ psi | 1.19 | 0.7 |
| Izod (Notched) $\frac{ft-lb}{in}$ | 7.43 | 1.0 |
| Heat Deflection Temp. at 264 psi, ° C. | 283 | 293 |
| Rockwell Hardness R | 108 | 88 |

It will be noted that the wholly aromatic polyester of Example I exhibits a superior tensile strength, flex strength, and impact strength.

EXAMPLE II

Example I was repeated with the exceptions indicated.

To a similar reactor were added the following:
a. 453.90 grams p-acetoxybenzoic acid (2.52 moles)
b. 181.61 grams 2,6-naphthalene dicarboxylic acid (0.84 mole)
c. 222.97 grams 4,4'-biphenol diacetate (0.84 mole)
d. 1.2 grams dibutyl tin oxide
e. 1584 grams terphenyl mixture heat exchange medium available from the Monsanto Co. under the trademark Therminol 66.

The p-acetoxybenzoic acid and 4,4'-biphenol diacetate reactants were soluble in the heat exchange medium, and the 2,6-naphthalenedicarboxylic acid reactant remained largely suspended therein as a finely divided solid.

The reaction slurry initially was heated to 230° C. over a period of 20 minutes and maintained at that temperature for 5 hours, heated to 240° C. over a period of 5 minutes and maintained at that temperature for 16 hours, heated to 270° C. over a period of 5 minutes and maintained at that temperature for about 1 hour, heated to 280° C. over a period of 5 minutes and maintained at that temperature for about 1 hour, heated to 290° C. over a period of 5 minutes and maintained at that temperature for 1.5 hours, heated to 300° C. over a period of 5 minutes and maintained at that temperature for 4 hours, heated to 310° C. over a period of 5 minutes and maintained at that temperature for 1 hour, heated to 320° C. over a period of 5 minutes and maintained at that temperature for 1 hour, and heated to about 335° C. over a period of 5 minutes and maintained at that temperature for 1 hour. About 234 ml. of acetic acid distillate was collected.

After cooling to ambient temperature (i.e., about 25° C.) the slurry was filtered and the solids Soxhlet extracted with acetone to remove residual heat exchange medium. Following oven drying 595 grams (i.e. 98% of theory) of the wholly aromatic polymer were collected which consisted of small light yellow particles.

When the product is subjected to differential scanning calorimetry, it exhibits a large sharp endotherm at about 395° C. (peak), and a remelt scan of this polymer shows a large sharp melt endotherm at about 385° C. (peak) which repeats at about 385° C. on subsequent scans.

When the melt is cooled in a differential scanning calorimeter at a rate of −20° C./min. a sharp polymer crystallization exotherm is observed at about 358° C. (peak) indicating a rapid crystallization at a relatively high temperature which confirms its molding propensity employing short cycle times. Actual molding runs confirm that the polymer molds easily via injection molding to yield a molded article of satisfactory physical properties, color, and surface characteristics.

EXAMPLE III

Example I was repeated with the exceptions indicated.

To a similar reactor were added the following:
a. 302.6 grams of p-acetoxybenzoic acid (1.68 mole)
b. 121.07 grams of 2,6-naphthalene dicarboxylic acid (0.56 mole)
c. 187.22 grams of 4,4'-sulfonyldiphenol(0.56 mole)
d. 1220 grams terphenyl mixture heat exchange medium available from the Monsanto Co. under the trademark Therminol 66.

The following heating sequence was utilized for the uncatalyzed reaction: 230° C. for 2 hours, 250° C. for 2 hours, 260° C. for 2 hours, 280° C. for 14 hours, 300° C. for 4 hours, 320° C. for 4 hours, and 340° C. for 2 hours with 5 to 10 minutes being consumed during each temperature change.

Following washing and drying 426 grams of the product were recovered (i.e., 96% of theory) which consisted of a very fine yellow powder. The melt temperature of the product by differential scanning calorimetry was 418° C. Similar molded articles of satisfactory properties may be formed via injection molding.

Although the invention has been described with preferred embodiments it is to be understood that variations and modifications may be employed without departing from the concept of the invention as defined in the following claims.

I claim:

1. An improved melt processable wholly aromatic polyester capable of forming a thermoplastic melt phase at a temperature below approximately 350° C. consisting essentially of the recurring moieties I, II and III wherein:

I is

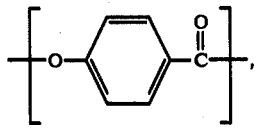

II is

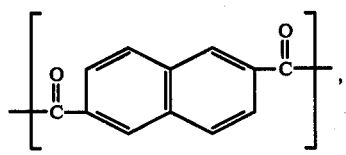

and

III is

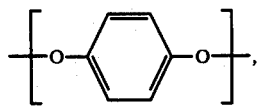

and wherein said polyester comprises approximately 35 to 80 mole percent of moiety I.

2. An improved melt processable wholly aromatic polyester capable of forming a thermotropic melt phase at a temperature below approximately 350° C. consisting of the recurring moieties I, II, and III wherein:

I is

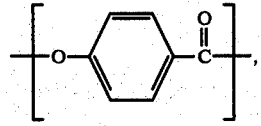

II is

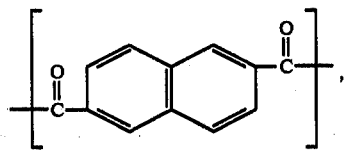

and
III is

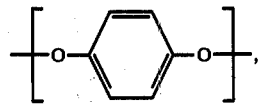

and wherein said polyester comprises approximately 40 to 75 mole percent of moiety I.

3. A melt processble wholly aromatic polyester according to claim 2 which is capable of forming a thermotropic melt phase below approximately 330° C. and which comprises approximately 50 to 70 mole percent of moiety I.

4. A melt processable wholly aromatic polyester according to claim 2 wherein the molar quantities of moieties II and III are substantially equal.

5. A melt processable wholly aromatic polyester according to claim 2 which consists of approximately 60 mole percent of moiety I, approximately 20 mole percent of moiety II, and approximately 20 mole percent of moiety III.

6. An improved molding compound comprising the melt processable wholly aromatic polyester of claim 2 which incorporates therein about 1 to 60 percent by weight of a solid filler and/or reinforcing agent.

7. A melt processable wholly aromatic polyester according to claim 1 which is capable of forming a thermotropic melt phase below approximately 330° C.

8. A melt processable wholly aromatic polyester according to claim 7 which comprises 40 to 75 mole percent of moiety I.

9. A melt processable wholly aromatic polyester according to claim 1 wherein the molar quantities of moieties II and III are substantially equal.

10. A melt processable wholly aromatic polyester according to claim 1 which comprises approximately 35 to 80 mole percent of moiety I, approximately 7.5 to 32.5 mole percent of moiety II, and approximately 7.5 to 32.5 mole percent of moiety III.

11. An improved molding compound comprising the melt processable wholly aromtic polyester of claim 1 which incorporates therein about 1 to 60 percent by weight of a solid filler and/or reinforcing agent.

* * * * *

UNITED STATES PATENT OFFICE
CERTIFICATE OF CORRECTION

Patent No. 4,067,852               Dated January 10, 1978

Inventor(s) Gordon W. Calundann

It is certified that error appears in the above-identified patent and that said Letters Patent are hereby corrected as shown below:

In the title delete "POLYBENZOYL" and insert --POLYOXYBENZOYL--.

In the Abstract, line 3, delete "intraciable or naturally" and insert --intractable or difficultly--.

Claim 1, line 2, delete "thermoplastic" and insert --thermotropic--.

Claim 11, line 2, delete "aromtic" and insert --aromatic--.

Signed and Sealed this

Twenty-third Day of May 1978

[SEAL]

Attest:

RUTH C. MASON
Attesting Officer

LUTRELLE F. PARKER
Acting Commissioner of Patents and Trademarks